US011610579B2

(12) United States Patent
Bapna et al.

(10) Patent No.: US 11,610,579 B2
(45) Date of Patent: Mar. 21, 2023

(54) PROCESSING NATURAL LANGUAGE USING MACHINE LEARNING TO DETERMINE SLOT VALUES BASED ON SLOT DESCRIPTORS

(71) Applicant: Google LLC, Mountain View, CA (US)

(72) Inventors: Ankur Bapna, Sunnyvale, CA (US); Larry Paul Heck, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 496 days.

(21) Appl. No.: 16/622,404

(22) PCT Filed: Jun. 18, 2017

(86) PCT No.: PCT/US2017/038056
§ 371 (c)(1),
(2) Date: Dec. 13, 2019

(87) PCT Pub. No.: WO2018/236332
PCT Pub. Date: Dec. 27, 2018

(65) Prior Publication Data
US 2020/0202846 A1   Jun. 25, 2020

(51) Int. Cl.
*G10L 15/18* (2013.01)
*G10L 15/16* (2006.01)
(Continued)

(52) U.S. Cl.
CPC ...... *G10L 15/1815* (2013.01); *G06F 16/3329* (2019.01); *G06N 3/0481* (2013.01);
(Continued)

(58) Field of Classification Search
None
See application file for complete search history.

(56) References Cited

U.S. PATENT DOCUMENTS 10,453,117 B1 *  10/2019  Reavely ................ G06F 40/30
10,565,498 B1 *   2/2020  Zhiyanov ............. G06N 7/005
(Continued)

OTHER PUBLICATIONS

European Patent Office; Summons to attend oral proceedings pursuant to Rule 115(1) EPC and communication from the Examining Division; 7 pages; dated Oct. 1, 2021.
(Continued)

*Primary Examiner* — Richa Mishra
(74) *Attorney, Agent, or Firm* — Gray Ice Higdon

(57) ABSTRACT

Determining slot value(s) based on received natural language input and based on descriptor(s) for the slot(s). In some implementations, natural language input is received as part of human-to-automated assistant dialog. A natural language input embedding is generated based on token(s) of the natural language input. Further, descriptor embedding(s) are generated (or received), where each of the descriptor embeddings is generated based on descriptor(s) for a corresponding slot that is assigned to a domain indicated by the dialog. The natural language input embedding and the descriptor embedding(s) are applied to layer(s) of a neural network model to determine, for each of the slot(s), which token(s) of the natural language input correspond to the slot. A command is generated that includes slot value(s) for slot(s), where the slot value(s) for one or more of slot(s) are determined based on the token(s) determined to correspond to the slot(s).

14 Claims, 9 Drawing Sheets

(51) Int. Cl.
*G06N 3/04* (2006.01)
*G06N 3/08* (2006.01)
*G06F 16/332* (2019.01)
*G10L 15/22* (2006.01)

(52) U.S. Cl.
CPC .............. *G06N 3/08* (2013.01); *G10L 15/16* (2013.01); *G10L 15/22* (2013.01)

(56) References Cited

U.S. PATENT DOCUMENTS

2013/0311997 A1    11/2013   Gruber et al.
2014/0278379 A1     9/2014   Coccaro et al.
2015/0066496 A1*   3/2015   Deoras ................. G06N 3/0472
                                                                                     704/232

OTHER PUBLICATIONS

European Patent Office; Preliminary Opinion issued in Application No. 17734585.7, 9 pages, dated May 24, 2022.
Ramshaw, L. et al. "Text Chunking Using Transformation-Based Learning;" ACL Third Workshop on Very Large Corpora, arXiv:cmp-lg/9505040v1; 13 pages May 23, 1995.
International Search Report and Written Opinion of PCT Ser. No. PCT/US2017/038056; 12 pages Mar. 9, 2018.
Intellectual Property India: Office Action issued for Application No. 201847005189 dated Aug. 24, 2020.

* cited by examiner

PROCESSING NATURAL LANGUAGE USING MACHINE LEARNING TO DETERMINE SLOT VALUES BASED ON SLOT DESCRIPTORS

BACKGROUND

An automated assistant (also known as "personal assistant", "mobile assistant", etc.) may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output). An automated assistant interacted with via a client device may be implemented via the client device itself and/or via one or more remote computing devices that are in network communication with the client device (e.g., computing device(s) in "the cloud").

Some automated assistants interact with one or more agents, such as third-party (3P) agents. For example, some automated assistants can process received natural language input to generate an agent command for a 3P agent, and transmit the generated agent command to the 3P agent. Responsive content can be generated by the 3P agent in response to the agent command, and utilized to provide output that is responsive to the natural language input. In some situations, the automated assistant receives the responsive content and provides the responsive content (or a conversion thereof) as responsive output. In some situations, the 3P agent itself may directly provide the responsive content without utilization of the automated assistant as an intermediary.

In processing natural language input to generate an agent command, some automated assistants seek to determine, based on the natural language input, slot value(s) for slot(s) that are pertinent to the agent command. The determined slot value(s) can be included in the agent command. Oftentimes, a party controlling the automated assistant may predefine slots that can be utilized by 3P agents. The processing of the natural language input to generate slot values is performed in view of such predefined slots. However, such predefined slots may not be applicable to various domains and/or intents for which a 3P agent is configured. For example, a desired slot for a 3P agent may not be defined by any of the predefined slots and/or may be defined too generally and/or too specifically by one or more of the predefined slots. This can limit the functionality of various 3P agents and/or result in computationally burdensome excess interactions with the 3P agent to resolve value(s) that were already previously indicated by prior natural language input. Further, any adaptation of the automated assistant to enable processing of slot value(s) for new slot(s) (e.g., adaptation to a new domain) can require a large amount of computationally burdensome training to be performed that is particularized to the new slot(s). Additional and/or alternative drawbacks are presented by various current slot value determination techniques.

SUMMARY

This specification is directed generally to methods, systems, and computer-readable media for determining slot value(s), for slot(s) of an agent command, based on natural language input token(s) and based on descriptor(s) for the slot(s). A descriptor for a slot can be a textual descriptor of the slot, such as a title and/or other descriptor that describes the parameter(s) that can be defined by a slot value for the slot. For example, a "restaurant reservation" domain can include various slots such as a slot with a "number of people" descriptor, another slot with a "restaurant name" descriptor, another slot with a "reservation date" descriptor, another slot with a "cuisine" descriptor, another slot with a "reservation time" descriptor, etc. In some implementations, in determining slot value(s), additional feature(s) for the slot(s) may be used that are in addition to descriptor(s) for the slot(s). For example, one or more special tokens for a slot of a common type may be utilized in addition to, or instead of, descriptor(s) for the slot. For instance, for a slot with a "leaving time" descriptor, special token(s) may additionally be utilized such as <departure> and/or <time> tokens.

In some implementations, natural language input is received as part of a dialog between a user (e.g., via a client device) and an automated assistant (e.g., implemented via the client device and/or one or more remote computing devices in network communication with the client device). The natural language input includes a sequence of tokens and can be received as a data stream. The tokens of the sequence can each be one or characters, such as one or more words (e.g., "chicago" or "new york") or character(s) that make up part of a word (e.g., tokens of "c", "h", "i", "c", "a", "g", and "o" instead of a single token of "Chicago"). A natural language input embedding is generated based on one or more of the token(s) of the natural language input. In some implementations, the natural language input embedding is additionally or alternatively generated based on annotations of the natural language input, such as annotations described herein (e.g., part of speech tags, entity annotations, dialog state). Further, descriptor embedding(s) are generated (or received), where each of the descriptor embeddings is generated based on descriptor(s) for a corresponding slot that is assigned to a domain indicated by the dialog. In some implementations or situations, the domain indicated by the dialog is a particular agent (e.g., a particular 3P agent), or a particular agent intent indicated by the dialog. The particular agent and/or particular agent intent can be indicated in the dialog through, for example, explicit invocation of the particular agent and/or agent intent (e.g., through an agent invocation phrase assigned to the particular agent). In some implementations or situations, the domain indicated by the dialog is applicable to multiple agents. For example, the domain can be a "book flight" domain that is applicable to at least a first flight booking agent and a second flight booking agent.

The natural language input embedding and the descriptor embedding(s) are applied to one or more layers of a neural network model to determine, for each of the slot(s), which token(s) (if any) of the natural language input correspond to the slot. In this manner, descriptor(s) of slot(s) are utilized (via application of the descriptor embedding(s)) in determining token(s) that correspond to the slot(s). A command is then generated that includes slot value(s) for one or more of the slot(s), where the slot value(s) for one or more of the slot(s) are determined based on the token(s) determined to correspond to the slot(s). For example, the slot value for a slot can be the token(s) that correspond to the slot, or another value (e.g., a unique entity identifier) determined based on the token(s). The command can be transmitted to an agent to cause the agent to generate responsive content in response to the command. The responsive content can be utilized to provide output that is responsive to the natural language input. In some situations, the automated assistant receives the responsive content and provides the responsive content (or a conversion thereof) as responsive output as part of the dialog. In some situations, the agent itself may directly provide the responsive content without utilization of the automated assistant as an intermediary.

In various implementations, the same neural network model can be utilized in determining value(s) for slot(s) across multiple disparate domains. In those implementations, the neural network model can be effectively adapted, to a current domain under consideration in a given pass, through the application (as input to the neural network model) of the descriptor embedding(s) for the slot(s) of the current domain under consideration. In some of those various implementations, the neural network model is trained utilizing training data from multiple domains, where each instance of training data includes: natural language input tokens (or an embedding thereof), descriptor(s) of slot(s) for the domain (or embedding(s) thereof), and an indication of which natural language input token(s) (if any) correspond to which slot(s). The trained neural network model can then be utilized in slot-filling for those domains and/or for additional domains. For example, the trained neural network model can then be utilized in slot-filling for additional domains that were not instantiated by any of the instances of training data utilized to train the neural network model. The neural network model may still be utilized to slot-fill for such unobserved domains since, in utilization, embedding(s) of descriptor(s) of slot(s) will be applied as input to the neural network model, and such embedding(s) may be similar (i.e., embedding distance wise) to descriptor embedding(s) of training instance(s). Application of embedding(s) of descriptor(s) of slot(s) to the neural network model can obviate the need for any explicit schema alignment.

Particular implementations of the subject matter described in this specification can be implemented so as to realize one or more of the following advantages. Natural language processing methods and models described in this specification can provide for improved data efficiency compared to other machine learning based methods, and may allow for training with less training data whilst maintaining performance characteristics. For example, by exploiting similarities between slot descriptions across multiple domains, the use of manually annotated data and/or explicit schema alignment can be reduced, and hence the overall amount of training data used in training the neural network model may be reduced. For instance, the neural network model can be utilized with a new domain (e.g., a new agent) without requiring any training based on training instances that are specific to the new domain (or reducing the amount of such training) and without requiring explicit schema alignment (and instead relying on slot descriptor(s)). Moreover, some implementations provide an improved neural network model architecture for natural language processing compared to existing architectures.

As one particular example of some implementations described herein, a neural network model can be trained utilizing training instances from multiple domains such as a "book bus ticket" domain, a "flight booking" domain, and a "restaurant reservation domain". Each of the training instances can include: (1) corresponding natural language input tokens; (2) slot descriptor(s) for slot(s) of the corresponding domain; and (3) an indication of the natural language input token(s) (if any) that correspond to the slot(s). For example, a first training instance for the "book bus ticket" domain can include: (1) natural language input tokens of "book a bus ride for 2 adults from Louisville to Chicago"; (2) a slot descriptor of "departure location"; and (3) an indication that "Louisville" is the only token for the slot having the slot descriptor of "departure location". Also, for example, a second training instance for the "book bus ticket" domain can include: (1) natural language input tokens of "book a bus ride for 2 adults from Louisville to Chicago"; (2) a slot descriptor of "arrival location"; and (3) an indication that "Chicago" is the only token for the slot having the slot descriptor of "arrival location". Also, for example, a third training instance for the "book bus ticket" domain can include: (1) natural language input tokens of "book a bus ride for 2 adults from Louisville to Chicago"; (2) a slot descriptor of "number of adult passengers"; and (3) an indication that "2" is the only token for the slot having the slot descriptor of "number of adult passengers".

The neural network model can be trained based on the training instances from the multiple domains. For example, for the first training instance above, the natural language input tokens of "book a bus ride for 2 adults from Louisville to Chicago" can be applied on a token-by-token basis to corresponding inputs of a bi-directional long short-term memory (LSTM) layer of the neural network model to generate an embedding of the tokens (i.e., where the embedding is the hidden state of the bi-directional LSTM layer after the application). As an alternative example, the natural language input tokens can be applied to non-memory layer(s) of the neural network model, such as convolutional layer(s) or feed forward layers with positional features. Further, an embedding of the slot descriptor of "departure location" can be generated. For example, the embedding of the slot descriptor can be a bag of words embedding (e.g., a bag of words average) or a Word2vec embedding generated via a separate machine learning model. Also, for example, the embedding of the slot descriptor can be generated based on application of the slot descriptor to layer(s) of the neural network model itself (e.g., LSTM layer(s), feed forward layer(s), or convolutional layer(s)). The embedding of the slot descriptor can be combined with the embedding of the tokens. For example, they can be combined through application of both as inputs to feed forward layer(s) of the neural network model. The combined output can then be applied to additional layer(s) (e.g., an additional bi-directional LSTM layer(s) and/or softmax layer(s)), to generate final output over the neural network model. The final output can, for example, indicate an in-out-begin (IOB) representation for each of the tokens. For instance, the final output can indicate, for each of the tokens, whether the token is: outside of the slot (i.e., not included in the slot), at the beginning of the slot (i.e., the first token for the slot), or inside the slot (i.e., a subsequent token for the slot). The final output can be compared to the indication that "Louisville" is the only token for the slot having the slot descriptor of "departure location", and weights of the neural network model updated in dependence on the comparison. For example, an error (if any) can be determined based on comparison of the final output to the indication that: "Louisville" is the token that should have been indicated as "the beginning of the slot" and all other tokens indicated as "outside of the slot". The neural network model can be updated based on the error and optionally errors from other training instances (e.g., updated through backpropagation of the error(s)).

Through training based on training instances from multiple domains, the neural network model is trained to be utilized to determine tokens of natural language input that correspond to a slot, utilizing both the tokens and the descriptor(s) of the slot. For example, assume an additional domain of "book cab", and further assume that no training instances from the "book cab" domain were utilized in training the neural network model. Nonetheless, the trained neural network model can still be utilized to determine slot value(s) for slot(s) of the domain based on natural language input. For instance, assume natural language input of "book a cab from the airport to downtown", and a slot for the "book cab" domain with a slot descriptor of "pickup location". An embedding of the natural language input tokens, and an embedding of the "pickup location" descriptor can be utilized to generate, over the neural network model, output that indicates "airport" corresponds to the slot with the "pickup location" descriptor. This can be the case even if "pickup location" was not a slot descriptor for any of the training instances utilized in training the neural network model. For example, the embedding for "pickup location" may still be "close enough" to embedding(s) for other "trained on" slot descriptors, such as "departure location", to enable utilization of the trained model to determine that "airport" corresponds to the slot with the "pickup location" descriptor. In these and other manners, techniques described herein provide for a neural network model that is adaptable to various domains without necessitating training on one or more of those domains (or reducing the number of training instances from those domains that are utilized in training). Moreover, in these and other manners, techniques described herein enable third-parties to define slots with natural language descriptors and without requiring that each of the defined slots conform to a predefined schema and/or without requiring that a large amount of labeled training data be generated to enable recognition of slot values for slots defined by third-parties.

Implementations described above and/or elsewhere herein enable slot values to be determined based on natural language input provided to an automated assistant, and based on slot descriptor(s) for a particular agent. Further, in some of those implementations an invocation request and/or other agent command is transmitted to the particular agent, where the agent command includes the determined slot values. Various implementations may lead to improved accuracy of slot values and/or improved breadth of slot values that can be determined and transmitted in an agent command. This may enable more efficient interactions with the particular agent, which may conserve various computational resources. For example, it may conserve network and/or processor resources that may otherwise be consumed through interactions with a particular agent in attempting to resolve value(s) that were previously indicated in prior natural language input of the user (but that would have gone unrecognized according to prior techniques). For instance, it may reduce the number of "turns" of dialog and/or other interactions that are required between the user and the particular agent to resolve value(s) necessary for enabling the particular agent to satisfy an intent of the user.

As used herein, an "agent" references one or more computing devices and/or software that are utilized by an automated assistant. In some situations, an agent can be separate from the automated assistant and/or may communicate with the automated assistant over one or more communication channels. In some of those situations, the automated assistant may transmit, from a first network node, data (e.g., an agent command) to a second network node that implements all or aspects of the functionality of the agent. In some situations, an agent may be a third-party (3P) agent, in that it is managed by a party that is separate from a party that manages the automated assistant. In some other situations, an agent may be a first-party (1P) agent, in that it is managed by the same party that manages the automated assistant.

An agent is configured to receive (e.g., over a network and/or via an API) an invocation request and/or other agent commands from the automated assistant. In response to receiving an agent command, the agent generates responsive content based on the agent command, and transmits the responsive content for the provision of user interface output that is based on the responsive content. For example, the agent may transmit the responsive content to the automated assistant for provision of output, by the automated assistant, that is based on the responsive content. As another example, the agent can itself provide the output. For instance, the user can interact with the automated assistant via a client device (e.g., the automated assistant can be implemented on the client device and/or in network communication with the client device) and the agent can be an application installed on the client device or an application executable remote from the client device, but "streamable" on the client device. When the application is invoked, it can be executed by the client device and/or brought to the forefront by the client device (e.g., its content can take over a display of the client device).

Various types of input are described herein that may be provided by a user, via user interface input device(s), to an automated assistant and/or to an agent. In some instances the input may be natural language input that is free-form, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

In some situations, in response to invocation of a particular agent according to techniques disclosed herein, a human-to-automated assistant dialog may be at least temporarily transferred (actually or effectively) to the particular agent. For example, output that is based on responsive content of the particular agent may be provided to the user in furtherance of the dialog, and further user input received in response to the output. The further user input (or a conversion thereof) may be provided to the particular agent. The particular agent may utilize its own semantic engines and/or other components in generating further responsive content that can be used to generate further output for providing in furtherance of the dialog. This general process may continue until, for example, the particular agent provides responsive content that terminates the particular agent dialog (e.g., an answer or resolution instead of a prompt), additional user interface input of the user terminates the particular agent dialog (e.g., instead invokes a response from the automated assistant or another agent), etc.

In some situations the automated assistant may still serve as an intermediary when the dialog is effectively transferred to the particular agent. For example, in serving as an intermediary where natural language input of a user is voice input, the automated assistant may convert that voice input to text, provide the text (and optionally annotations of the text) to the particular agent, receive responsive content from the particular agent, and provide output that is based on the particular responsive content for presentation to the user. Also, for example, in serving as an intermediary, the automated assistant may analyze user input and/or responsive content of the particular agent to determine if dialog with the particular agent should be terminated, if the user should be transferred to an alternate agent, if global parameter values should be updated based on the particular agent dialog, etc. In some situations the dialog may be actually transferred to the particular agent (without the automated assistant serving as an intermediary once transferred), and optionally transferred back to the automated assistant upon occurrence of one or more conditions such as termination by the particular agent (e.g., in response to completion of an intent via the particular agent).

In some implementations, a method performed by one or more processors is provided and includes: receiving natural language input generated based on user interface input during a human-to-automated assistant dialog; generating a token embedding of tokens determined based on the natural language input; selecting a domain based on the human-to-automated assistant dialog; and determining at least one slot descriptor embedding for at least one textual descriptor of a slot assigned to the selected domain. The at least one textual slot descriptor embedding is determined based on the at least one slot descriptor or the slot descriptor embedding being assigned to the selected domain in one or more computer readable media. The method further includes determining, based on application of the token embedding and the slot descriptor embedding to a trained neural network model, that one or more of the tokens correspond to the slot assigned to the selected domain. The method further includes: generating an agent command that includes a slot value for the slot that is based on the token determined to correspond to the slot; and transmitting the agent command to an agent over one or more networks. The agent command causes the agent to generate responsive content and transmit the responsive content over one or more networks.

These and other implementations of technology disclosed herein may optionally include one or more of the following features.

In some implementations, selecting the domain includes selecting the agent based on the human-to-automated assistant dialog, and the at least one slot descriptor embedding is determined based on the at least one slot descriptor or the slot descriptor embedding being assigned to the agent.

In some implementations, the method further includes receiving the responsive content generated by the agent. In some of those implementations, the method further includes transmitting, to a client device at which the user interface input was provided, output that is based on the responsive content generated by the agent.

In some implementations, determining, based on application of the token embedding and the slot descriptor embedding to a trained neural network model, that one or more of the tokens correspond to the slot assigned to the selected domain includes: applying both the token embedding and the slot descriptor embedding to a combining layer of the trained neural network model. In some of those implementations, the combining layer is a feed forward layer and/or generating the token embedding of the tokens of the natural language input includes applying the tokens to a memory layer of the trained neural network model to generate the token embedding. The memory layer can optionally be a bi-directional memory layer including a plurality of memory units. The combining layer can be downstream from the memory layer, and upstream from one or more additional layers of the neural network model (e.g., an additional memory layer and/or an affine layer).

In some implementations, generating the token embedding of the tokens of the natural language input includes applying the tokens to a memory layer of the trained neural network model, and applying one or more annotations of one or more of the tokens to the memory layer.

In some implementations, a natural language processing method using a neural network model is provided and includes: receiving a natural language data stream comprising a sequence of tokens; generating one or more embedded representations of one or more of the tokens; and applying, to a layer of the neural network model, one or more embedded representations of one or more descriptors for one or more slots. The method further includes identifying a correspondence between a descriptor and one or more tokens. Identifying the correspondence includes processing the one or more embedded representations of the one or more tokens and the one or more embedded representations of the one or more descriptors, using the neural network model. The method further includes transmitting data relating to the identified correspondence from a first network node to a second network node. The second network node is configured to perform one or more actions in response to receiving the data, including causing responsive content to be generated and transmitted.

These and other implementations of technology disclosed herein may optionally include one or more of the following features.

The method can further include receiving the responsive content at the first network node.

One or more of the received embedded representations of one or more descriptors can relate to a domain that is not among the one or more domains on which the neural network was trained.

The neural network model can be a neural network model trained using multiple sample natural language data streams and sample embedded representations of descriptors for one or more slot tags from a plurality of domains.

The one or more embedded representations of the one or more descriptors can be applied as input to a combining layer of the neural network model, along with the one or more embedded representations of the one or more tokens. The combining layer can include a feed forward layer and/or can be located in the neural network model between two memory layers.

The final layer of the neural network model can include a soft-max layer configured to output an in-out-begin representation of the received sequence of tokens.

The method can further include classifying the sequence of tokens into a semantic domain, prior to inputting an embedded representation of the tokens into a layer of the neural network model.

The method can further include: receiving, at a microphone, a voice input; and generating the sequence of tokens from the voice input using a voice-to-text algorithm.

Generating the one or more embedded representations of one or more of the tokens can be performed based on applying the one or more of the tokens to the neural network model—or can be performed within a further neural network model.

In some implementations, a method of training a neural network model for natural language processing is provided and includes: applying, to a layer of the neural network model, one or more embedded representations of one or more descriptors for one or more slots' and receiving natural language data streams relating to multiple domains. The data streams include tokens having a known correspondence to the one or more descriptors. The method further includes: generating one or more embedded representations of one or more of said tokens; processing, using the neural network model, the one or more embedded representations of the one or more tokens and the one or more embedded representations of the one or more descriptors to identify a correspondence between a descriptor and one or more tokens; comparing the identified correspondence with the known correspondence; and updating weights in the neural network model in dependence on the comparison.

These and other implementations of technology disclosed herein may optionally include one or more of the following features.

The method can further include tuning hyper-parameters of the neural network model in dependence on a determined performance of the neural network model.

The one or more embedded representations of descriptors can be applied at a combining layer of the neural network model. The combining layer can be configured to combine the one or more embedded representations of one or more descriptors with the one or more embedded representations of the one or more tokens. The combining layer can include a feed forward layer and/or can be located in the neural network model between two memory layers.

In some implementations, an apparatus is provided that includes a processor and a memory. The memory includes computer-readable code which, when executed by the processor, causes the processor to provide a neural network for processing data relating to a sequence of tokens in a natural language data stream. The neural network includes a plurality of layers including at least one memory layer, and the neural network is configured to: receive, at one of the plurality of layers, one or more embedded representations of one or more descriptors for one or more slot tags; and identify a correspondence between a descriptor and one or more tokens. Identifying the correspondence includes processing the one or more embedded representations of the one or more tokens and the one or more embedded representations of the one or more descriptors, using the neural network.

These and other implementations of technology disclosed herein may optionally include one or more of the following features. The one or more embedded representations of the one or more descriptors can be received at a combining layer. The combining layer can be configured to combine the one or more embedded representations of one or more descriptors with the one or more embedded representations of the one or more tokens. The neural network can include first and second memory layers, and the combining layer can be located between the first and second memory layers. The first and second memory layers can include long short-term memory layers, such as bidirectional long short-term memory layers. The neural network can be configured to receive the sequence of tokens as an input into a memory layer of the neural network. The neural network can include a soft-max layer configured to output an in-out-begin representation of the input sequence of tokens.

In addition, some implementations include one or more processors of one or more computing devices, where the one or more processors are operable to execute instructions stored in associated memory, and where the instructions are configured to cause performance one or more methods described herein. The processors may include one or more graphics processing units (GPUs), central processing units (CPUs), and/or tensor processing units (TPUs). Some implementations include one or more non-transitory computer readable storage media storing computer instructions executable by one or more processors to perform one or more methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
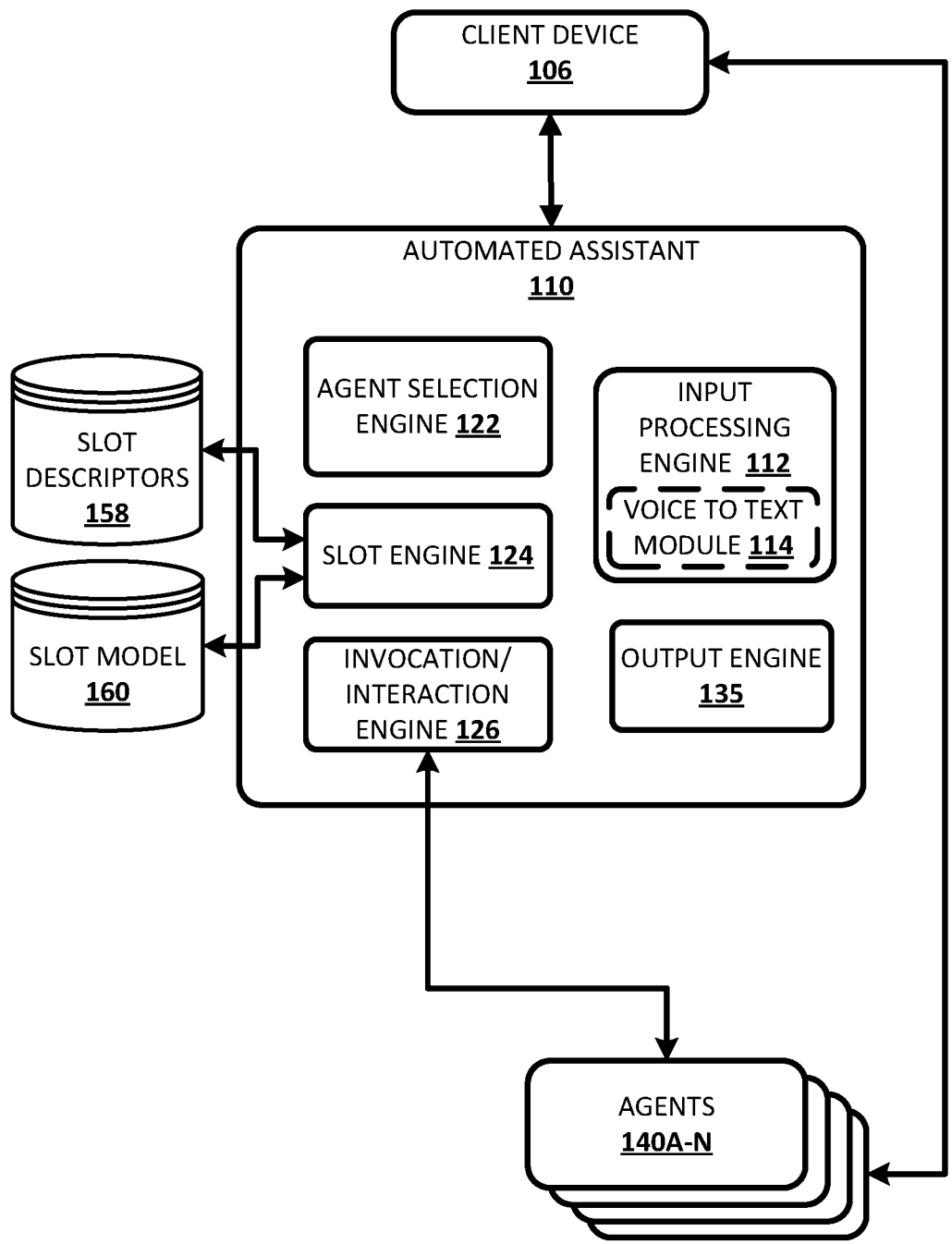
FIG. 1 is a block diagram of an example environment in which implementations disclosed herein may be implemented.

FIG. 1 illustrates an example environment in which techniques disclosed herein may be implemented. The example environment includes a client device 106, an automated assistant 110, and a plurality of agents 140A-N. The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations, input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet).

Although only one client device 106 is illustrated in combination with the automated assistant 110, in many implementations the automated assistant 110 may be remote and may interface with each of a plurality of client devices of the same user and/or with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 is separate from the agents 140A-N and communicates with the agents 140A-N via an API and/or via one or more communications channels (e.g., an internal communications channel of client device 106 and/or a network, such as a WAN). In some implementations, one or more of the agents 140A-N are each managed by a respective party that is separate from a party that manages the automated assistant 110.

One or more of the agents 140A-N may each optionally provide, directly or indirectly, agent slot descriptors for storage in slot descriptors database 152. The provided slot descriptors for a given agent may define, for each of one or more intents handled by the agent, descriptor(s) of slot(s) for those intents. For example, in registering with the automated assistant 110, one or more of the agents 140A-N may provide (e.g., transmit over a WAN) to automated assistant 110 and/or other component, an intent that can be handled by the agent, along with descriptors of slot(s) for the domain and/or intent. For instance, user(s) that program the agent 140A may define slots for an intent of the agent, and define descriptors for the defined slots. The descriptors for the defined slots can be defined as natural language text and can be defined via a graphical user interface via typed or spoken input of the user(s). Special token(s) can additionally or alternatively be assigned by the user(s) to one or more of the defined slots, such as special token(s) that are defined by a party managing the automated assistant 110 and that are directed to common slot types. The automated assistant 110 and/or other component can validate and store such slot descriptors (and optionally special tokens) in association with the agent in the slot descriptors database 152. Additionally or alternatively, the automated assistant 110 and/or other component can generate embeddings for the slot descriptors (and optionally special tokens), and store the descriptor embeddings in association with the agent in the slot descriptors database 152. Slot descriptors database 152 may additionally or alternatively store one or more slot descriptors (and optionally special tokens) in association with domains that are defined less granularly than particular agents. For example, some slot descriptors may be stored in association with a general "travel" domain, which may be a domain handled by multiple agents. Such slot descriptors (and optionally special tokens) may also be stored in association with particular agents when those slot descriptors are also applicable to those particular agents. Slot descriptors database 152 may additionally store other features for various agents, such as invocation phrase(s) for invoking each of the agents 140A-N, rankings of agents, popularity measures of agents, etc.

The automated assistant 110 includes an input processing engine 112, an agent selection engine 122, a slot engine 124, an invocation/interaction engine 126, and an output engine 135. In some implementations, some of the engines of automated assistant 110 may be omitted, combined, and/or implemented in a component that is separate from automated assistant 110. Moreover, automated assistant 110 may include additional engines not illustrated herein for the sake of simplicity.

The automated assistant 110 receives instances of user input from the client device 106. For example, the automated assistant 110 may receive a natural language data stream including a sequence of tokens. For instance, the automated assistant 110 can receive a natural language data stream in response to typed user input or can receive a natural language voice input data stream in the form of a streaming audio recording. The streaming audio recording may be generated by the client device 106 in response to signals received from a microphone of the client device 106 that captures spoken input of a user of the client device 106. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input.

The automated assistant 110 provides an instance of output in response to receiving an instance of user input from the client device 106. The instance of output may be, for example, audio to be audibly presented by the device 106 (e.g., output via a speaker of the client device 106), text and/or graphical content to be graphically presented by the device 106 (e.g., rendered via a display of the client device 106), etc. As described herein, some instances of the output may be based on responsive content generated by a selected one of the agents 140A-N.

The input processing engine 112 of automated assistant 110 processes natural language input received from client device 106 and generates annotated output for use by one or more other components of the automated assistant 110, such as agent selection engine 122 and/or slot engine 124. For example, the input processing engine 112 may process natural language free-form input that is generated by a user via one or more user interface input devices of client device 106. The generated annotated output includes tokens that are based on the natural language input and optionally includes one or more annotations of the natural language input. As described herein, token(s) and/or annotations generated by the input processing engine 112 may be applied as input to the slot model 160 and utilized to generate an embedding of the natural language input. For example, a tokens embedding of natural language input can be generated based on tokens of the natural language input, and based on: part of speech tags of the tokens, entity tags of the tokens, and/or a representation of the current state of the dialog. Each token is a sequence of one or more characters, such as a single term or other n-gram (e.g., tokens can be "cab", "Chicago", "New York", "2"). The input processing engine 112 may optionally standardize or otherwise transform some n-grams in generating tokens. For example, the input processing engine 112 may remove capitalizations, transform dates to a standard format, transform relative temporal terms to a standard format (e.g., transform "tomorrow" to a date that corresponds to "tomorrow), transform numbers to a generic identifier (e.g., transform any number to "#") etc.

In some implementations, the input processing engine 112 includes a voice to text module 114 that receives an instance of voice input (e.g., in the form of digital audio data), and converts the voice input into text that includes one or more text words or phrases. The converted text can then be utilized by the input processing engine 112 to generate tokens and/or other data. In some implementations, the voice to text module 114 is a streaming voice-to-text engine that uses one or more voice-to-text algorithms to generate text based on voice input. The voice to text module 114 may rely on one or more stored voice to text models (also referred to as language models) that each may model a relationship between an audio signal and phonetic units in a language, along with word sequences in the language. In some implementations, intermediate output(s) of the voice to text module 114 may be utilized as tokens and/or additional annotations of the natural language input that are applied to the slot model 160. For example, lattices generated by the voice to text module 114 may be applied to the slot model 160 as a representation of tokens of the natural language input. A lattice is a graph that compactly represents multiple possible hypotheses for an utterance. Accordingly, the lattice represents possible tokens of the natural language input.

In some implementations, the input processing engine 112 is configured to identify and annotate various types of grammatical information in natural language input. For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the input processing engine 112 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity to resolve a particular entity. In some implementations, entities resolved for tokens may be utilized as slot values for corresponding slots in addition to, or in lieu of, tokens that are determined to correspond to those slots.

In some implementations, the input processing engine 112 may additionally and/or alternatively include a coreference resolver configured to group, or "cluster," references to the same entity based on one or more contextual cues. For example, the coreference resolver may be utilized to resolve the term "it" in an instance of user input to a preceding mention of "Restaurant A" in an immediately preceding instance of user input. In some of those implementations, the tokens supplied by the input processing engine 112 may include a referent of a pronoun in place of the pronoun itself. For example, "Restaurant A" can be provided as a token instead of "it."

In some implementations, the input processing engine 112 may additionally and/or alternatively include a dialog state component that generates output indicating a current state of a dialog. The output that indicates the current state of a dialog can be based on current natural language input and/or based on previous input (e.g., previous natural language input) that was previously received in the dialog. For example, the dialog state component can include a memory network that encodes utterances from one or more previous turns of a dialog. The encoding can thus provide a representation of the current state of the dialog.

In some implementations, one or more components of the input processing engine 112 may rely on annotations from one or more other components of the input processing engine 112. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the input processing engine 112 may use related prior input and/or other related data outside of the particular natural language input to determine one or more annotations.

The output engine 135 provides instances of output to the client device 106. An instance of output may be based on responsive content from one of the agents 140A-N (when the automated assistant 110 acts as an intermediary for that agent). In some implementations, the output engine 135 may include a text to speech engine that converts textual components of responsive content to an audio format, and the output provided by the output engine 135 is in an audio format (e.g., as streaming audio). In some implementations, the responsive content may already be in an audio format. In some implementations, the output engine 135 additionally or alternatively provides textual reply content as output (optionally for conversion by the device 106 to audio) and/or provides other graphical content as output for graphical display by the client device 106.

The agent selection engine 122 selects one or more of the agents 140A-N that are indicated by a current dialog with the client device 106. The agent selection module 122 can select one or more of the agents 140A-N based on input provided by the user in the dialog and/or based on other data. Other data on which the agent selection module 122 can select an agent can include, for example: historical interactions of a user of the client device (e.g., which agent(s) has the user utilized in the past for a given domain and/or intent), popularity of the agent, a rating of the agent, currently rendered and/or recently rendered content on the client device, a location of the client device, current date and/or time, etc.

In some implementations, the agent selection engine 122 selects a particular agent based on an explicit invocation of the agent by the user in the dialog. For example, some agents may be associated with an explicit invocation phrase, and the agent selection engine 122 can select a particular agent based on natural language input that includes the invocation phrase for the particular agent. In some implementations, the agent selection engine 122 selects one or more particular agents based on the agent(s) being associated with an intent, and the intent being indicated by the user in the dialog. For example, the agent selection engine 122 can select an agent based on an intent indicated by the most recent natural language input provided to the automated assistant in the dialog and/or past natural language input provided in the dialog. The agent selection engine 122 may optionally rely on annotated output from input processing engine 112 in determining an intent. In some situations, where an agent is capable of acting upon multiple intents, the agent selection module 122 may select a particular agent, and a particular intent for the agent.

The slot engine 124 determines slot value(s) for slot(s) that are assigned to a domain currently indicated in the dialog. For example, the slot engine 124 can determine slot values for slot(s) that are assigned to an agent selected by the agent selection module 122. As described herein, the slot engine 124 can determine one or more of the slot values based on tokens of received natural language input, and based on slot descriptor(s) for the corresponding slot(s). For example, slot descriptors (or embeddings thereof) can be stored in association with a selected agent (and optionally intent) in slot descriptors database 158. The slot engine 124 can apply embeddings of the slot descriptors, and tokens of received natural language input (or embeddings thereof), to slot model 160 to determine which tokens correspond to which slots. The slot engine 124 can then assign the tokens, and/or value(s) based on the tokens, as slot values for their corresponding slots. Additional description of the slot engine 124 is provided below and elsewhere herein.

The invocation/interaction engine 126 transmits an agent command to an agent selected by agent selection engine 122 and includes, in the agent command, slot values determined by the slot engine 124. The agent command can be a structured command that includes slot value(s) in associated slots, and optionally additional data such as an indication of an intent, a user identifier, a session identifier, etc. In some implementations or situations, the agent command is an invocation command that invokes the selected agent. In some implementations or situations, the agent is already invoked in the dialog (e.g., based on prior natural language input), and the agent command is provided in furtherance of dialog that involves the invoked agent. The selected agent can generate responsive content in response to the agent command. In some implementations, the responsive content is transmitted, by the selected agent to the automated assistant 110, and the output engine 135 generates output based on the responsive content. For example, the output engine 135 can provide the responsive content, unaltered, as output—or can perform a text to speech conversion (or other conversion) of the responsive content, and provide the converted content as output. In some implementations, the responsive content is transmitted, by the selected agent, directly to the client device 106. In yet other implementations, the selected agent may operate locally on the client device 106 (e.g., be an application installed on the client device 106), and can generate the responsive content for direct display on the client device 106.

Each of the agents 140A-N may include its own content engine, and/or other engines. Moreover, in many implementations an agent may access various stored models and/or other resources (e.g., its own grammar model(s) and/or content model(s)) in generating responsive content.

Figure 2:
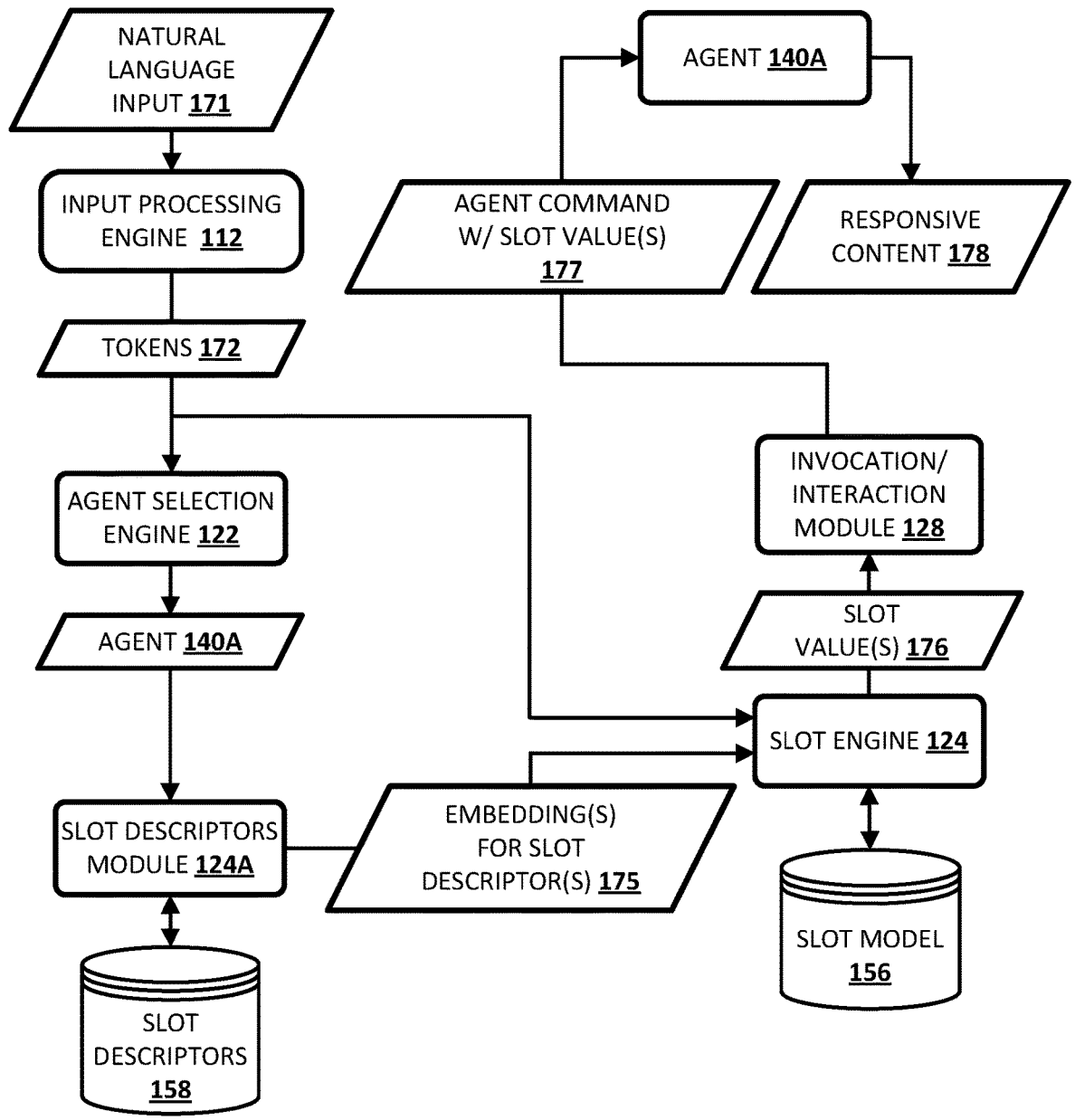
FIG. 2 is an example of how various components of FIG. 1 may interact in some implementations.

Referring to FIG. 2, an example is illustrated of various components of FIG. 1 and how they may interact in some implementations. In FIG. 2, natural language input 171 is received by the input processing engine 112 of the automated assistant 110. As a working example, the natural language input 171 may be "book a table for 4, outdoor seating, Restaurant A". The input processing engine 112 generates tokens 172 based on the natural language input and provides the tokens 172 to the slot engine 124 and the agent selection engine 122. In some implementations, additional annotations of the natural language input 171 may additionally be provided to the engine 122 and/or engine 124.

The agent selection engine 122 utilizes the tokens 172 and/or other data to select a particular agent, and provides an indication of the agent 140A to slot descriptors module 124A, and optionally to invocation/interaction module 128. Continuing with the working example, the agent selection engine 122 may select the particular agent based on it being associated with a "restaurant reservation" intent and based on the user having previously indicated the particular agent as his/her preferred "restaurant reservation" agent.

The agent selection engine 122 provides the indication of the agent 140A to the slot descriptors module 124A, which may be a module of slot engine 124. The slot descriptors module 124A accesses slot descriptors database 158 to identify embedding(s) for slot descriptor(s) 175 that are assigned to the agent 140A (and optionally the intent, when the selected agent has multiple intents) in the database 158. The slot descriptors module 124A provides the embedding(s) for slot descriptor(s) 175 to the slot engine 124. In some implementations, the slot descriptors module 124A instead identifies slot descriptor(s) themselves from the database 158, and generates the embedding(s) for slot descriptor(s) 175. For example, the slot descriptors module 124A may generate the embedding(s) based on application of the slot descriptor(s) to a bag of words model, a Word2vec model, and/or other model that generates word embeddings. In some implementations, the agent selection engine 122 may not select a particular agent and may, instead, select a more general domain that is applicable to multiple agents. In some of those implementations, the slot descriptors module 124A identifies and provides embedding(s) for slot descriptors that are assigned to the more general domain.

The slot engine 124 utilizes the tokens 172, and the embedding(s) for slot descriptor(s) 175 to determine which tokens 172 correspond to which slot(s) (if any). In particular, the slot engine 124 applies the tokens 172 and the embedding(s) for slot descriptor(s) 175 as input to the slot model 160 and generates, over the slot model 160 based on the input, output(s) that indicate which tokens 172 correspond to which slot(s) (if any). The slot engine 124 utilizes the output(s) to determine which tokens 172 correspond to which slot(s). As described herein, in some implementations the slot engine 124 additionally applies, as input to the slot model 160, one or more annotations related to the tokens 172, such as annotations provided by the input processing engine 112. Additional description of examples of slot model 160 are described with respect to FIG. 3 and FIG. 4.

The slot engine 124 generates slot value(s) 176 for one or more slot(s) based on the corresponding determined tokens. For example, the slot value(s) 176 can correspond strictly to the tokens, or can be entity identifiers or other indications of the tokens. Continuing with the working example, the slot engine 124 can determine, based on one or more passes over slot model 160, that: "4" is a slot value for a slot with a "number of people" descriptor, "outdoor" is a slot value for a slot with a "seating location" descriptor, and "Restaurant A" is a slot value for a slot with a "restaurant name" descriptor.

The slot engine 124 provides the slot value(s) 176 to the invocation/interaction module 128. The invocation/interaction module 128 generates an agent command 177 that includes the slot value(s) 176, and transmits the agent command 177 to the agent 140A selected by agent selection engine 122. The agent 140A generates responsive content 178 in response to the agent command 177. The responsive content 178 can be provided to the automated assistant 110 and output generated by the automated assistant 110 based on the responsive content 178. Alternatively, the responsive content 178 can be transmitted by the agent 140A directly to the client device that provided the natural language input 171.

In some implementations, the agent command 177 is an invocation request that invokes the agent 140A with the slot value(s) 176. As described herein, in some situations the automated assistant 110 may still serve as an intermediary after the agent 140A is invoked. As also described herein, in some situations the dialog may be actually transferred to the agent 140A (without the automated assistant 110 serving as an intermediary once transferred), and transferred back to the automated assistant 110 upon occurrence of one or more conditions. Further, as also described herein, in some situations the agent 140A can be executed by the client device 106 and/or brought to the forefront by the client device 106 (e.g., its content can take over a display of the client device 106).

Figure 3:
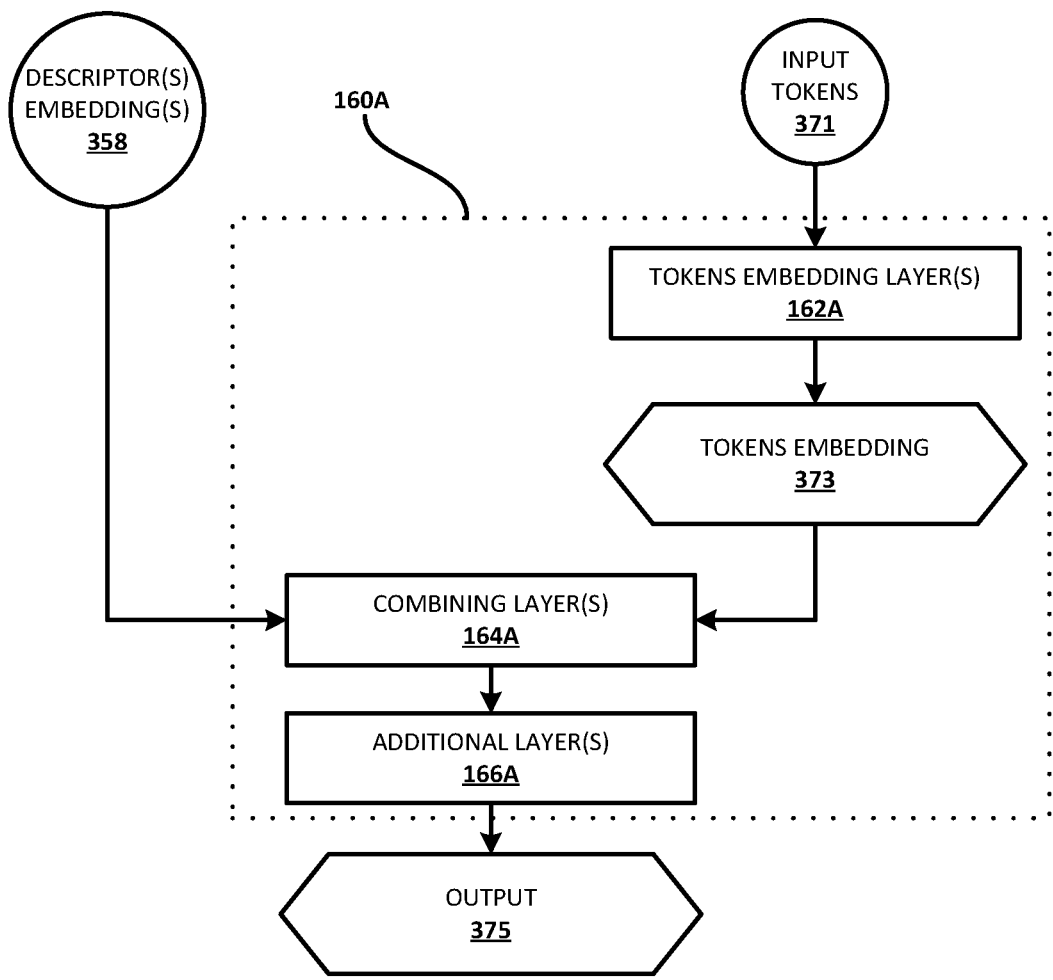
FIG. 3 illustrates an example of a slot model.
Figure 4:
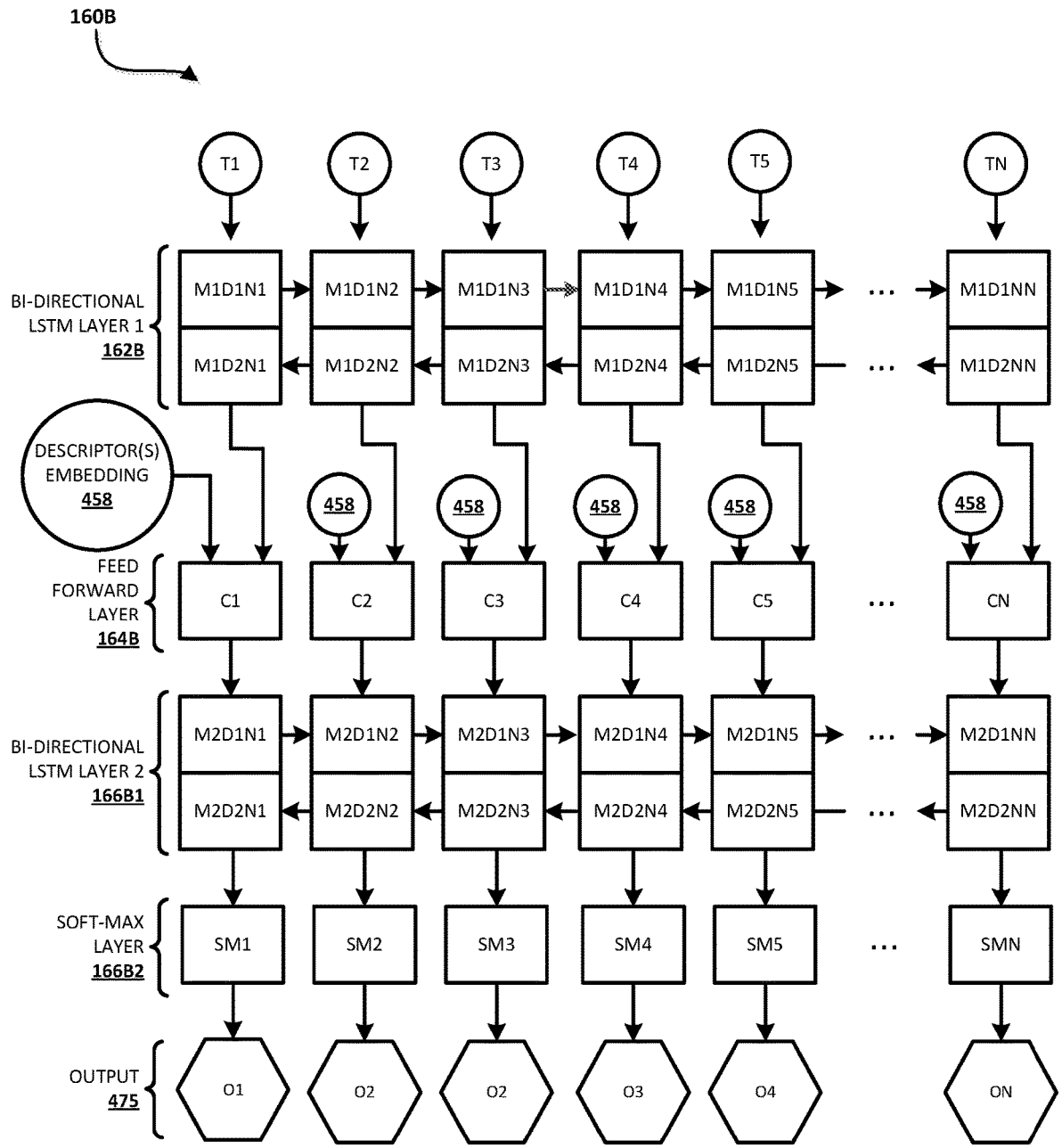
FIG. 4 illustrates another example of a slot model.

FIG. 3 illustrates a slot model 160A, which is one example of slot model 160 of FIG. 1. The slot model 160A includes token embedding layer(s) 162A, combining layer(s) 164A, and additional layer(s) 166A. Input tokens 371, from a natural language data stream, can be applied as input to the tokens embedding layer(s) 162A to generate tokens embedding 373. In some implementations, the tokens embedding layer(s) 162A are memory layers, in that they include one or more memory units to which the tokens can be sequentially applied and, at each time step of applied input, the memory unit(s) can be utilized to calculate a new hidden state based on the input of that time step and based on a current hidden state (that can be based on input(s) of prior time step(s)). In some implementations, a memory unit can be a long short-term memory ("LSTM") unit. In some implementations, additional or alternative memory unit(s) may be utilized such as a gated recurrent unit ("GRU"). As described herein, in some implementations the tokens embedding layer(s) 162A include a bidirectional memory layer. A bidirectional memory layer contains a first set of one or more memory units used to operate on an input sequence in a first direction and a second set of one or more memory units used to operate on the input sequence in an opposite direction. For example, assume tokens T1, T2, T3, and T4 are to be applied to a bidirectional memory layer. The tokens may be applied sequentially to the first set of memory units in the order: T1, T2, T3, T4—and applied to the second set of memory units in the order: T4, T3, T2, T1. The outputs of the first and second recurrent neural network units can be combined (e.g., appended) and utilized as the tokens embedding 373. One example of a tokens embedding layer that is a bi-directional memory layer is illustrated in FIG. 4.

The tokens embedding 373 and descriptor(s) embedding(s) 358 are applied as input to combining layer(s) 164A. Each of the descriptor(s) embedding(s) 358 is an embedding of one or more descriptors of a slot as described herein. In some implementations, each of the descriptor(s) embedding(s) 358 is generated based on application of corresponding descriptor(s) of a slot to a separate neural network model. In some other implementations, descriptor embedding layers may optionally be integrated in the slot model 160A, and descriptor(s) themselves applied to the descriptor embedding layers to generate the descriptor(s) embeddings.

The combining layer(s) 164A are used to generate output that is based on both the tokens embedding 373 and the descriptor(s) embedding(s) 358. In some implementations, the combining layer(s) 164A may be feed forward layer(s).

Output generated based on the combining layer(s) 164A is applied to one or more additional layers 166A to generate final output 375. The additional layer(s) 166A may include an affine layer, such as a soft-max layer. An affine layer can be of the form y=f(Wx+b), where x represents the input layers (e.g., the output generated based on the combining layer(s) 164A), W represents the parameters, b is a bias vector, and f is a nonlinear activation function (e.g., a soft-max activation function).

The output 375 indicates, for each of the input tokens 371 and for each of the descriptor embedding(s) 358, whether the input token corresponds to the descriptor embedding. For example, where descriptor(s) embedding(s) 358 include only an embedding of descriptor(s) for only a single slot, the output 375 can indicate whether each token is inside, outside, or at the beginning of that single slot. Also, for example, where descriptor(s) embedding(s) 358 include at least a first embedding of descriptor(s) for a first slot and a second embedding of descriptor(s) for a second slot, the output 375 can indicate: whether each token is inside, outside, or at the beginning of the first slot; and whether each token is inside, outside, or at the beginning of the second slot.

FIG. 4 illustrates a slot model 160B, which is another example of slot model 160 of FIG. 1. Slot model 160B includes a first bi-directional LSTM layer 162B. The first bi-directional LSTM layer 162B includes first direction memory units M1D1N1-M1D1NN and second direction memory units M1D2N1-M1D2NN. The first direction memory units M1D1N1-M1D1NN operate on tokens T1-TN of natural language input in a first direction that conforms to their actual sequence in received natural language input. For example, token T1 is applied as input to M1D1N1. Output generated based on application of token T1 to M1D1N1 is applied to M1D1N2, along with token T2. Output generated based on the application, to M1D1N2, of token T2 and the output from M1D1N1—is applied to M1D1N3, along with token T3. This continues until M1D1NN is reached. It is noted that if the quantity of tokens in the natural language input is less than the quantity of first direction memory units M1D1N1-M1D1NN, "padding" values may be applied as inputs to those first direction memory units M1D1N1-M1D1NN that are in excess of the quantity of tokens. A "padding" value can be a null value or other value that indicates that no token is present.

The second direction memory units M1D2N1-M1D2NN operate on tokens T1-TN of natural language input in a second direction that is opposite to their actual sequence. For example, token TN is applied as input to M1D2NN. Output generated based on application of token TN to M1D2NN is applied to M1D2NN-1 (unillustrated), along with token TN-1 (also unillustrated). This continues until M1D2N1 is reached. It is noted that if the quantity of tokens in the natural language input is less than the quantity of second direction memory units M1D2N1-M1D2NN, "padding" values may be applied as inputs to those second direction memory units M1D2N1-M1D2NN that are in excess of the quantity of tokens.

Feed forward layer 164B includes a plurality of feed forward units C1-CN. The output generated based on the first bi-directional LSTM layer 162 is applied as input to feed forward layer 164B, along with descriptor(s) embedding 458. For example, the output generated based on M1D1N1 and M1D2N1 (e.g., a concatenation of the two outputs) is applied to C1 along with descriptor(s) embedding 458. Also, for example, the output generated based on M1D1N2 and M1D2N2 is applied to C2 along with descriptor(s) embedding 458.

The output generated based on applying the inputs to the feed forward layer 164B is applied as input to second bi-directional LSTM layer 166B1. The second bi-directional LSTM layer 166B1 includes first direction memory units M2D1N1-M2D1NN and second direction memory units M2D2N1-M2D2NN. The first direction memory units M2D1N1-M2D1NN operate in a first direction on outputs generated based on C1-CN, and the second direction memory units M2D2N1-M2D2NN operate on those outputs in an opposite second direction.

Soft-max layer 166B2 includes soft-max units SM1-SMN. The output generated based on the second bi-directional LSTM layer 166B1 is applied as input to the soft-max layer 166B2. For example, the output generated based on M2D1N1 and M2D2N1 (e.g., a concatenation of the two outputs) is applied to SM1. Also, for example, the output generated based on M2D1N2 and M2D2N2 (e.g., a concatenation of the two outputs) is applied to SM2.

Final output 475 is generated based on the input applied to the soft-max layer 166B2. Output 475 includes a plurality of separate outputs O1-ON. Each of the outputs O1-ON corresponds to one of the tokens T1-TN (i.e., O1 corresponds to T1, O2 corresponds to T2, etc.). In some implementations, each of the outputs O1-ON indicates whether the corresponding token is outside of the slot described by the descriptor(s) (i.e., not in the slot), at the beginning of the slot (i.e., the first token for the slot), or inside the slot (i.e., a subsequent token for the slot). In some of those implementations, each of the outputs O1-ON is a corresponding single value whose magnitude indicates whether it is outside, at the beginning, or inside the slot. In some other of those implementations, each of the outputs O1-ON includes three values corresponding to outside, beginning, and inside—and the magnitudes of those values indicates whether the token is outside, at the beginning, or is inside.

Although a particular slot model 160B is illustrated in FIG. 4, it is understood that other slot models may have a different architecture, and the particular architecture (e.g., the type(s) of layers, the quantity of layers, and the sequence of layers) can depend on the actual task. For example, in some implementations multiple descriptor(s) embeddings may be applied to the model, with each of the embedding(s) being for descriptor(s) for a different slot. In those implementations, the dimensions of layers 164B, 166B1, and 166B2 may be expanded to accommodate the additional embeddings—and the generated output may indicate, for each of the tokens and for each of the slots, whether there is a correspondence between the token and the slot. For example, if five descriptor(s) embeddings are applied to the model, the output can include five outputs for each of the tokens, where each output indicates the correspondence between a corresponding token and a corresponding one of the five slots. As another example of how the architecture of FIG. 4 may vary, in some implementations, the feed forward layer 164B may be moved from its position in FIG. 4, to a position that is between the second bi-directional LSTM layer 166B1 and the soft-max layer 166B2 (and the descriptor(s) embedding still applied at the feed forward layer 164B). In such an example, the embedding of the tokens would be generated based on both the first and the second bi-directional LSTM layers 162B and 166B1.

Figure 5:
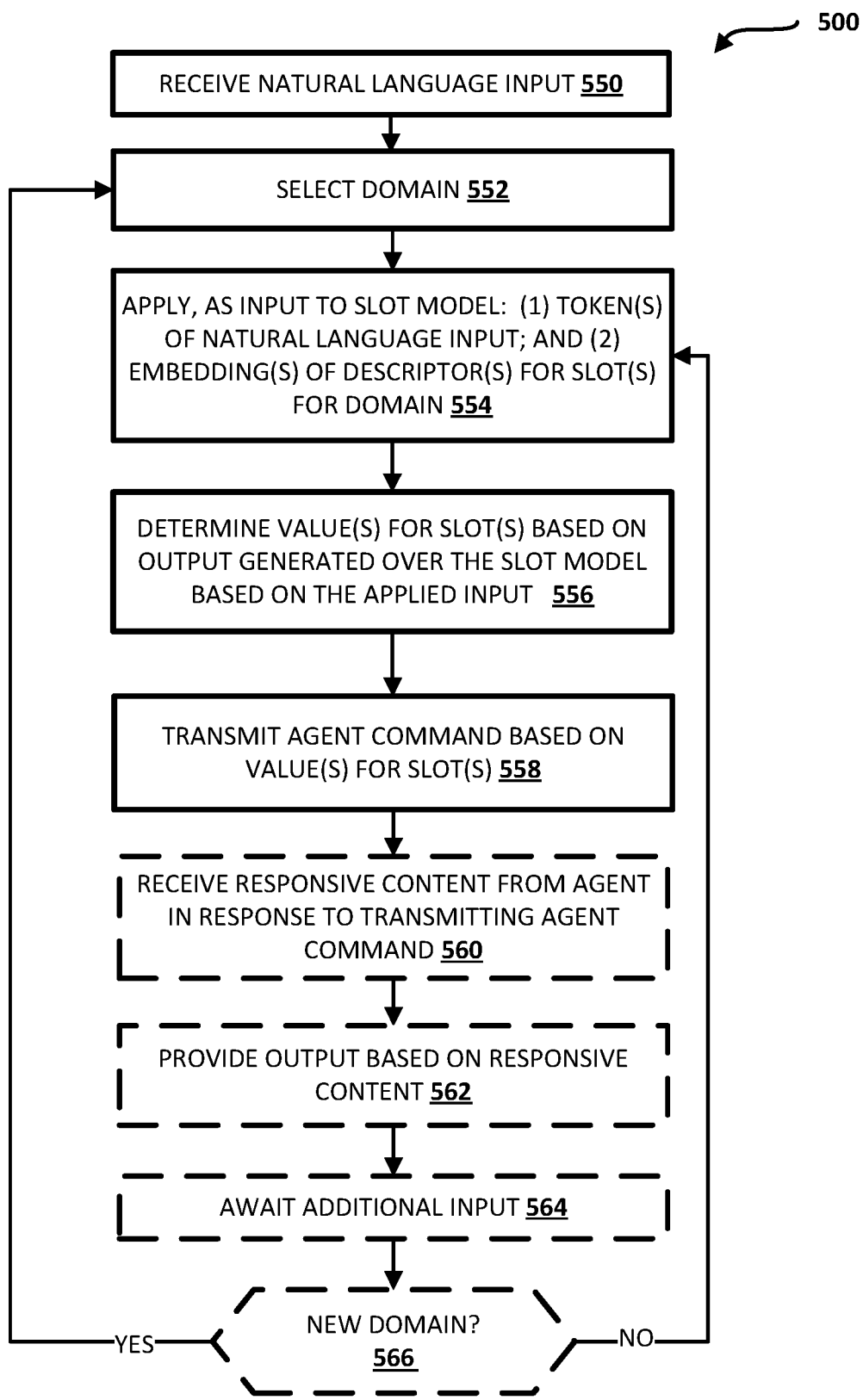
FIG. 5 is a flowchart illustrating an example method of utilizing a trained slot model according to implementations disclosed herein.

FIG. 5 is a flowchart illustrating an example method 500 of utilizing a trained slot model according to implementations disclosed herein. For convenience, the operations of the flow chart of FIG. 5 are described with reference to a system that performs the operations. This system may include various components of various computer systems, such as one or more components of automated assistant 110. Moreover, while operations of method 500 are shown in a particular order, this is not meant to be limiting. One or more operations may be reordered, omitted or added.

At block 550, the system receives natural language input. For example, the system can receive a natural language data stream that includes a sequence of tokens.

At block 552, the system selects a domain. The system can select the domain based on the natural language input received at block 550, previously received natural language input, and/or other data. In some implementations, in selecting a domain the system selects a particular agent, such as particular 3P agent. In some of those implementations, the system selects the particular agent based on invocation of the particular agent in the natural language input received at block 550, or in previously received natural language input. In some other of those implementations, the system selects the particular agent based on historical interactions of a user of a client device that generated the natural language input, indicated preferences of that user, and/or other data.

At block 554, the system applies, as input to a slot model: (1) token(s) of the natural language input received at block 550; and (2) embedding(s) of descriptor(s) for slot(s) for the domain selected at block 552. The embedding(s) of descriptor(s) for slot(s) for the domain are applied based on the slot(s) and/or descriptor(s) (or descriptor embedding(s)) being assigned to the domain in one or more computer readable media. For example, the domain may be a particular agent, and the slot(s) selected based on being assigned to the particular agent. The slot model can be a trained neural network model.

At block 556, the system determines value(s) for slot(s) of the domain based on output generated over the slot model based on the input applied to the slot model in block 554. For example, the output generated over the slot model can indicate, for each of the tokens of the natural language input and for each of the slot(s) (and/or slot descriptor(s)), whether the token corresponds to the slot (and/or slot descriptor(s)). For token(s) determined to correspond to a slot, the system can include the token(s) as values for the slot(s)—and/or determine another value for the slot based on the token(s).

At block 558, the system transmits an agent command based on the value(s) for the slot(s) determined at block 556. For example, the system can generate the agent command by including the value(s) in corresponding slot(s) of the agent command, and transit the generated agent command.

At optional block 560, the system receives responsive content from the agent in response to transmitting the agent command at block 558.

At optional block 562, the system provides output that is based on the responsive content received at block 560. For example, the output can be provided for presentation via the client device that provided the natural language input of block 550.

At optional block 564, the system awaits additional input from the client device that provided the natural language input of block 550.

When additional input is received at block 564, at block 566 the system determines whether the additional input indicates a new domain (e.g., a new agent). If so, the system proceeds back to block 552. If not, the system may proceed back to block 554 and apply, to the slot model, token(s) of any natural language input of the additional input, along with the embedding(s) of descriptor(s) for slots(s) for the domain. The system may then proceed to block 556 to determine new value(s) for slot(s) (e.g., previously undefined slots) based on the input applied at a most recent iteration of block 554. The system can then proceed to block 558 and generate another agent command based on the new value(s).

Figure 6:
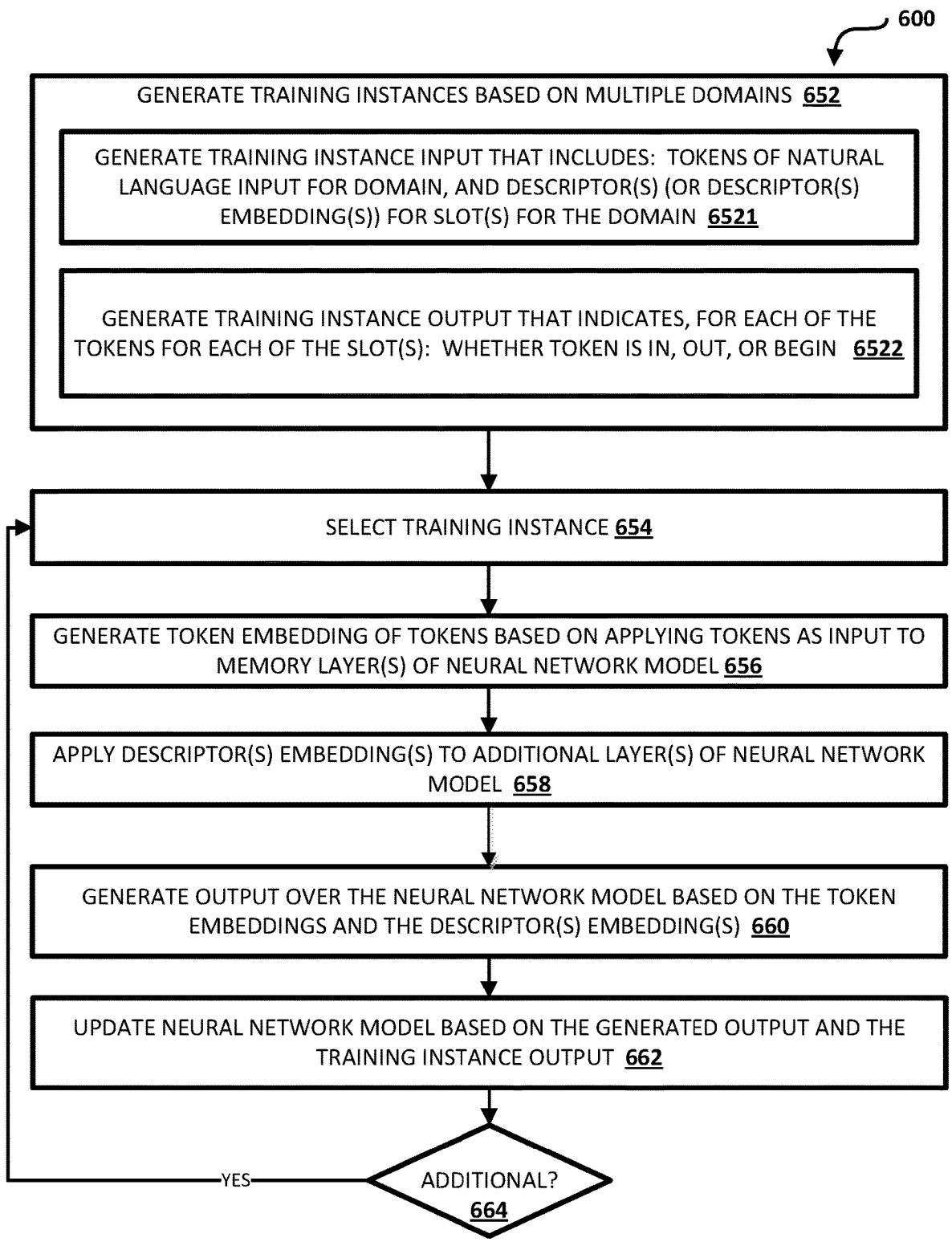
FIG. 6 is a flowchart illustrating an example method of training a slot model that is a neural network model, according to implementations disclosed herein.

FIG. 6 is a flowchart illustrating an example method 600 of training a slot model that is a neural network model, according to implementations disclosed herein. For convenience, the operations of the flow chart of FIG. 6 are described with reference to a system that performs the operations. This system may include various components of various computer systems, such as one or more GPU(s), CPU(s), and/or TPU(s). Moreover, while operations of method 600 are shown in a particular order, this is not meant to be limiting. One or more operations may be reordered, omitted or added.

At block 652, the system generates training instances based on multiple domains. In generating a training instance based on a domain, block 652 includes sub-blocks 6521 and 6522. Multiple iterations of sub-blocks 6521 and 6522 are performed, and multiple iterations can be performed for each of the multiple domains.

At block 6521, the system generates training instance input that includes: tokens of natural language input for the domain, and descriptor(s) (or descriptor(s) embedding(s)) for slot(s) for the domain. The natural language input for the domain can be based on actual user provided natural language input provided to an automated assistant for the domain. The descriptor(s) for slot(s) for the domain can be textual descriptions that semantically describe the slots, such as textual descriptions provided by developer(s).

At block 6522, the system generates training instance output that indicates, for each of the tokens for each of the slot(s): whether the token is in (inside the slot), out (outside the slot), or begin (the beginning of the slot). The training instance output can optionally be based on labelling by reviewers and/or verification of labelling by reviewers.

At block 654, the system selects one of the training instances generated at block 652.

At block 656, the system generates a token embedding of tokens of the training instance input of the training instance, based on applying the tokens as input to memory layer(s) of the neural network model.

At block 658, the system applies descriptor(s) embedding(s) of the training instance input (or generated based on the training instance input) to additional layer(s) of the neural network model.

At block 660, the system generates output over the neural network model based on both the token embeddings and the descriptor(s) embedding(s).

At block 662, the system updates the neural network model based on the generated output and the training instance output of the training instance. For example, the system can determine an error based on the generated output and the training instance output, and backpropagate the error over the neural network model to update weights of the neural network model.

At block 664, the system determines whether there are one or more additional unprocessed training instances. If so, the system proceeds back to block 654, selects an additional training instance, then performs blocks 656, 658, 660 and 662 based on the additional unprocessed training instance. In some implementations, at block 664 the system may determine not to process any additional unprocessed training instances if one or more training criteria have been satisfied (e.g., a threshold number of epochs have occurred and/or a threshold duration of training has occurred). Although method 600 is described with respect to a non-batch learning technique, batch learning may additionally and/or alternatively be utilized.

A neural network model trained according to method 600 can thereafter be utilized to predict, for future natural language input, which tokens of the natural language input correspond to slot(s), utilizing the tokens and descriptor(s) of the slot(s). It is noted that such a neural network model is adaptable to various domains that are in addition to the multiple domains of block 652, without necessitating training on one or more of those domains (or reducing the number of training instances from those domains that are utilized in training). For example, such a neural network model can be used to determine token(s) that correspond to a slot, based on slot descriptor(s) for the slot—even if the slot descriptor(s) (or an embedding thereof) was not included in any of the training instances of block 652.

Figure 7:
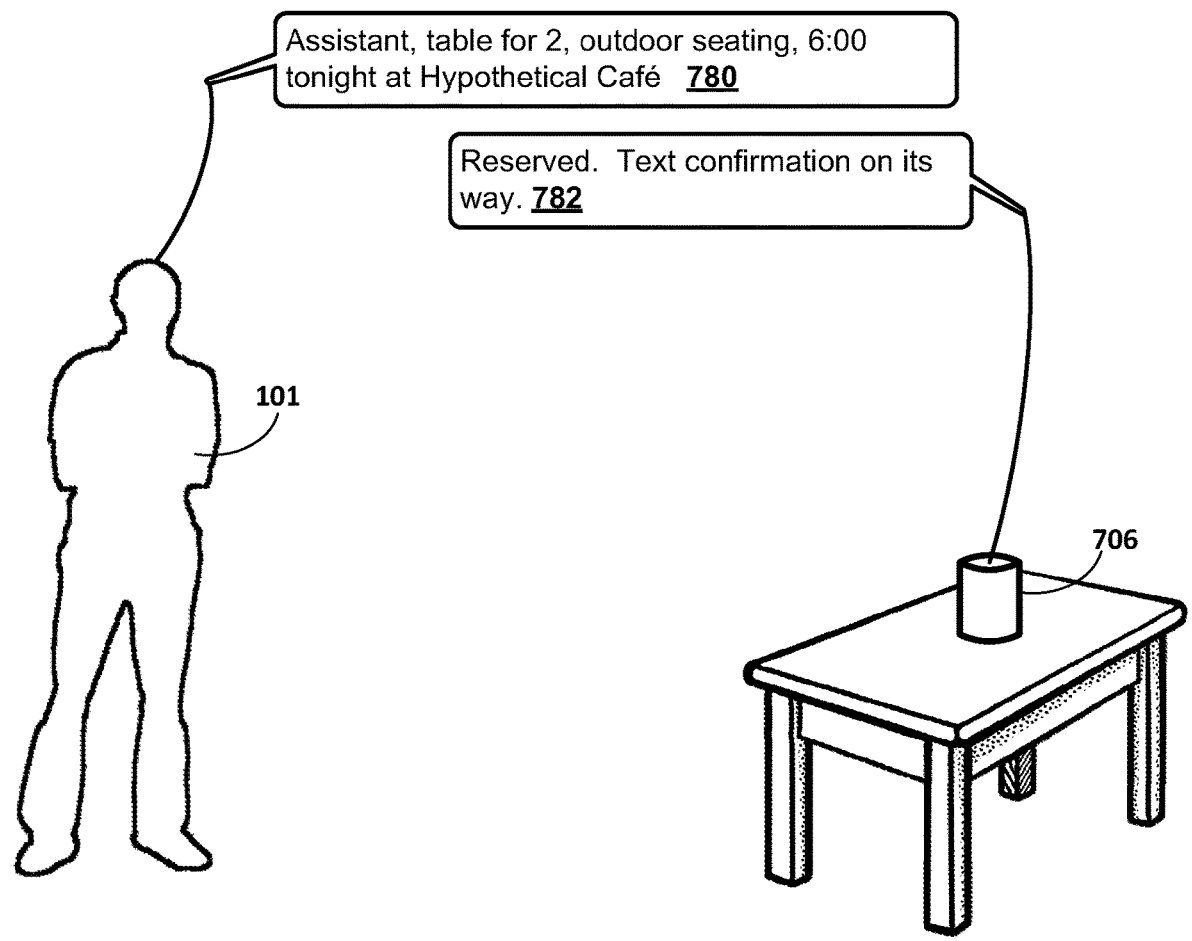
FIG. 7 illustrates a user and an example client device.

FIG. 7 illustrates a user 101 and a voice-enabled client device 706. The client device 706 includes one or more microphones and one or more speakers. One or more aspects of the automated assistant 110 of FIG. 1 may be implemented on the client device 706 and/or on one or more computing devices that are in network communication with the client device 706. Accordingly, for ease in explanation, the automated assistant 110 is referenced in description of FIG. 7.

In FIG. 7, the user provides spoken input 780 of "Assistant, table for 2, outdoor seating, 6:00 tonight at Hypothetical Café". Voice input corresponding to the spoken input is generated by the device 806 and provided to the automated assistant 110 (e.g., as streaming voice input). The automated assistant 110 can utilize techniques described herein to determine, based on the spoken input 780, various slot values for an agent command. For example, the automated assistant 110 can determine the slot values based on determining which tokens of the spoken input 780 correspond to which slots of a domain, such as a "restaurant reservation" domain or a particular "restaurant reservation" agent. In doing so, the automated assistant 110 can utilize a slot model and embedding(s) of descriptor(s) of the slots of the domain.

The automated assistant 110 can transmit the agent command to an agent, receive responsive content in response, and provide output 782 that is based on the responsive content. In FIG. 7, the agent command enabled the agent to complete the restaurant reservation, and the responsive content can indicate that the reservation is completed and that a text confirmation of the restaurant will be provided to the user. The output 782 reflects such responsive content.

Figure 8:
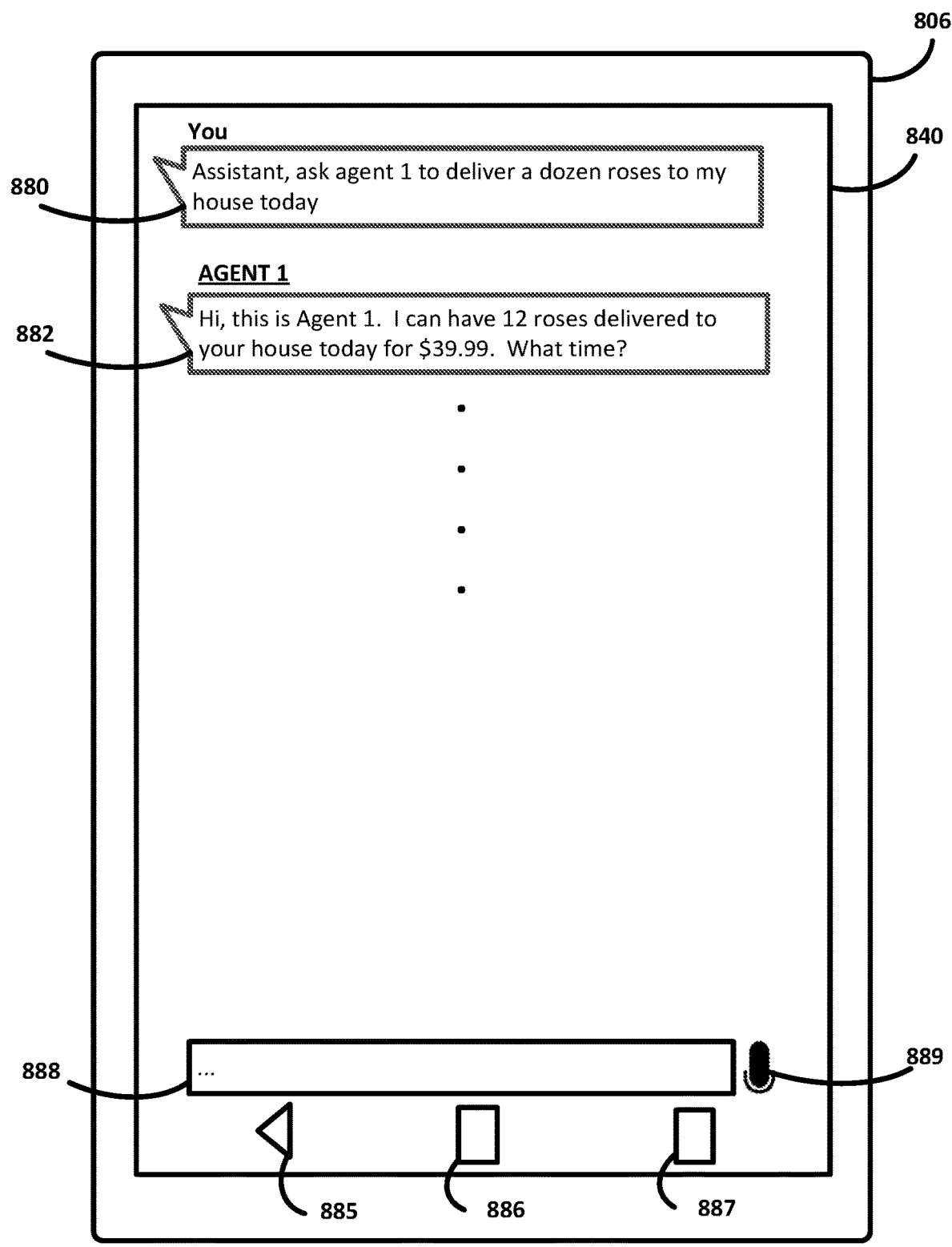
FIG. 8 illustrates an additional example client device.

FIG. 8 illustrates another client device 806 and a display screen 840 of the client device 806. The client device 806 may include and/or be in communication with the automated assistant 110. The display screen 840 includes a reply interface element 888 that the user may select to generate user input via a virtual keyboard and a voice reply interface element 889 that the user may select to generate user input via a microphone. In some implementations, the user may generate user input via the microphone without selection of the voice reply interface element 889. For example, during the dialog, active monitoring for audible user interface input via the microphone may occur to obviate the need for the user to select the voice reply interface element 889. In some of those and/or in other implementations, the voice reply interface element 1089 may be omitted. The display screen 840 also includes system interface elements 885, 886, 887 that may be interacted with by the user to cause the client device 810 to perform one or more actions.

In FIG. 8, the user provides natural language input 880 of "Assistant, ask agent 1 to deliver a dozen roses to my house today." The automated assistant 110 can select "agent 1" based on its invocation in the natural language input 880 (i.e., "ask agent 1") and can further determine descriptor(s) of slot(s) (or embedding(s) of the descriptor(s)) to utilize in determining slot value(s) for slot(s) of "agent 1". Based on embedding(s) of the descriptor(s), and tokens of the natural language input 880, the automated assistant 110 can determine slot value(s) for an agent command, and transmit the agent command to "agent 1". In response, "agent 1" generates responsive content that is the prompt 882 shown in FIG. 8. In some implementations, the responsive content is provided to the automated assistant 110 and the automated assistant 110 provides the prompt (along with an indication that it is "agent 1" generated content). In some other implementations, "agent 1" can provide the prompt 882 directly without the automated assistant 110 serving as an intermediary.

FIG. 8 is illustrated as an example of graphical interactions with automated assistant 110 and/or agents (in lieu of the spoken/audible interactions of FIG. 7). Although FIG. 8 illustrates one example of graphical interactions, different examples are contemplated. For example, instead of "agent 1" providing prompt 882 via a common interface with the automated assistant as illustrated in FIG. 8—"agent 1" may instead be a separate application that is launched and/or brought to the forefront in response to invocation. For instance, in response to natural language input 880, an "agent 1" application interface may supplant the automated assistant interface of FIG. 8, then provide output similar to prompt 882.

Figure 9:
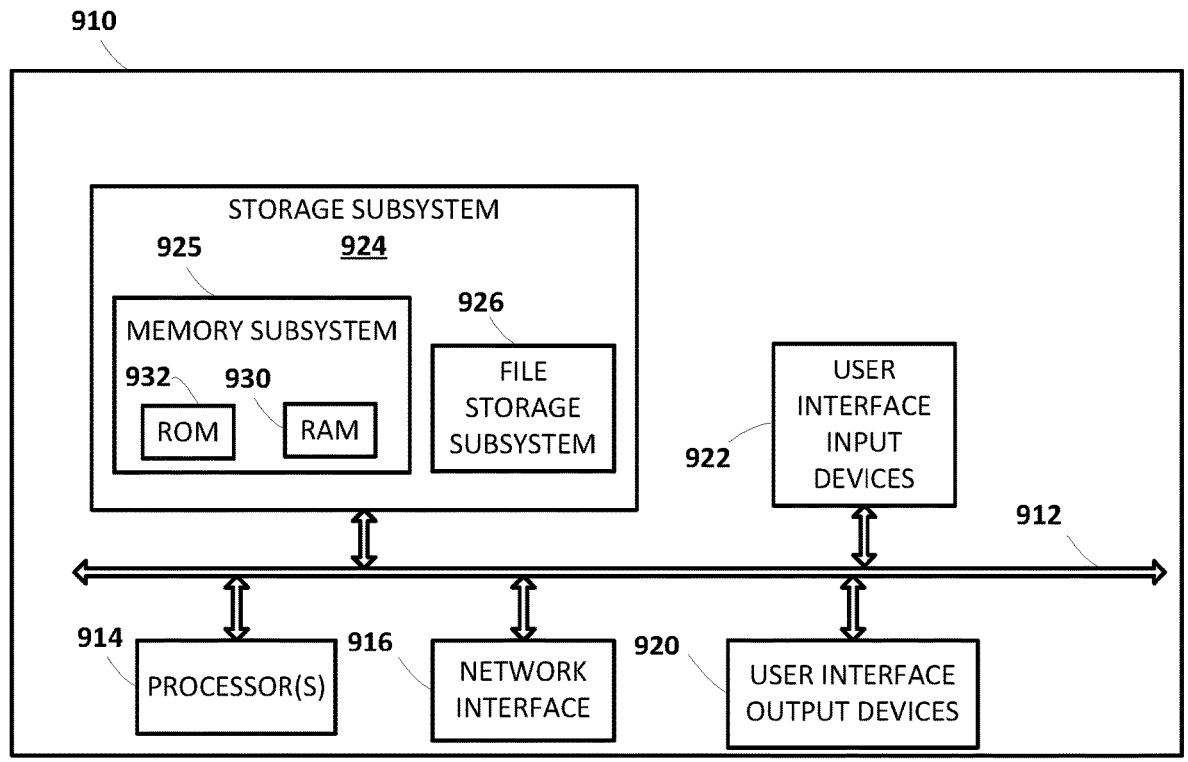
FIG. 9 illustrates an example architecture of a computing device.

FIG. 9 is a block diagram of an example computing device 910 that may optionally be utilized to perform one or more aspects of techniques described herein. In some implementations, one or more of client device 106, automated assistant 110, an agent, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method(s) of FIG. 5 and/or FIG. 6.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations described herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, implementations described herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A natural language processing method using a neural network model, the method implemented by one or more processors and comprising:
   receiving a natural language data stream comprising a sequence of tokens, the natural language data stream generated based on user interface input during a human-to-automated assistant dialog;
   generating one or more embedded representations of one or more of the sequence of tokens;

identifying a domain based on the human-to-automated assistant dialog;
applying, based on identifying the domain and to the neural network model, one or more embedded representations of one or more descriptors for one or more slots of the domain, wherein each of the descriptors is a corresponding natural language descriptor of a corresponding one of the one or more slots of the domain, and wherein the one or more embedded representations, of the one or more descriptors, are generated based on applying the one or more descriptors to a machine learning model;
identifying a correspondence between a descriptor and one or more tokens, wherein identifying said correspondence comprises processing the one or more embedded representations of the one or more tokens and the one or more embedded representations of the one or more descriptors, using the neural network model,
  wherein the one or more embedded representations of the one or more descriptors are applied as input to a combining layer of the neural network model, along with the one or more embedded representations of the one or more tokens, and
  wherein the combining layer is a feed forward layer;
transmitting data relating to the identified correspondence from a first network node to a second network node, the second network node being configured to perform one or more actions in response to receiving said data, the one or more actions including causing responsive content to be generated and transmitted; and
receiving the responsive content at the first network node.

2. The method of claim 1, wherein the domain that is not among one or more domains on which the neural network was trained.

3. The method of claim 1, wherein the neural network model is a neural network model trained using multiple sample natural language data streams and sample embedded representations of descriptors for one or more slot tags from a plurality of domains.

4. The method of claim 1, wherein the combining layer is located in the neural network model between two memory layers.

5. The method of claim 1, wherein the final layer of the neural network model comprises a soft-max layer configured to output an in-out-begin representation of the received sequence of tokens.

6. The method of claim 1, wherein the method further comprises classifying the sequence of tokens into a semantic domain, prior to inputting an embedded representation of the sequence of tokens into a layer of the neural network model.

7. The method of claim 1, wherein the user interface input is voice input and the method further comprises:
  receiving, at a microphone, the voice input; and
  generating the sequence of tokens from the voice input using a voice-to-text algorithm.

8. The method of claim 1, wherein generating the one or more embedded representations of one or more of the sequence of tokens is performed based on applying the one or more of the sequence of tokens to the neural network model.

9. The method of claim 1, wherein generating the one or more embedded representations of one or more of the sequence of tokens is performed within a further neural network model.

10. An apparatus comprising a processor and a memory, wherein the memory includes computer-readable code which, when executed by the processor, causes the processor to:
  data stream generated based on user interface input directed to a particular agent, of a plurality of agents for an automated assistant, during a human-to-automated assistant dialog;
  generate one or more embedded representations of one or more of the sequence of tokens;
  provide a neural network for processing data relating to a sequence of tokens in a natural language data stream,
  wherein the neural network comprises a plurality of layers including at least one memory layer, the neural network being configured to:
    receive, at one of said plurality of layers, one or more embedded representations of one or more descriptors for one or more slot tags defined for the particular agent, wherein the one or more embedded representations, of the one or more descriptors, are generated based on applying the one or more descriptors to a machine learning model,
      wherein the one or more embedded representations of the one or more descriptors are received at a combining layer, the combining layer being a feed forward layer configured to combine the one or more embedded representations of one or more descriptors with the one or more embedded representations of the one or more tokens; and
    identify a correspondence between a descriptor and one or more tokens, wherein identifying said correspondence comprises processing the one or more embedded representations of the one or more tokens and the one or more embedded representations of the one or more descriptors, using the neural network;
    transmit data relating to the identified correspondence from a first network node to a second network node, the second network node being configured to perform one or more actions in response to receiving said data, the one or more actions including causing responsive content to be generated and transmitted; and
    receive the responsive content at the first network node.

11. The apparatus of claim 10, wherein the neural network comprises first and second memory layers, wherein the combining layer is located between the first and second memory layers.

12. The apparatus of claim 11, wherein the first and second memory layers comprise long short-term memory layers.

13. The apparatus of claim 11, wherein the first and second memory layers comprise bidirectional long short-term memory layers.

14. The apparatus of claim 10, wherein the neural network comprises a soft-max layer configured to output an in-out-begin representation of the input sequence of tokens.

* * * * *